United States Patent
Matsuhashi

[11] Patent Number: 5,819,429
[45] Date of Patent: Oct. 13, 1998

[54] TOUCH SENSOR

[75] Inventor: Akira Matsuhashi, Tokyo, Japan

[73] Assignee: Metrol Co., Ltd., Tachikawa, Japan

[21] Appl. No.: 775,101

[22] Filed: Dec. 30, 1996

Related U.S. Application Data

[63] Continuation-in-part of Ser. No. 542,301, Oct. 12, 1995, Pat. No. 5,594,995.

[51] Int. Cl.⁶ .................................................. G01B 5/012
[52] U.S. Cl. .............................................. 33/558; 33/561
[58] Field of Search ............................ 33/556, 557, 558, 33/559, 560, 561

[56] References Cited

U.S. PATENT DOCUMENTS

| | | | |
|---|---|---|---|
| 4,203,225 | 5/1980 | Nilsson | 33/561 |
| 4,279,080 | 7/1981 | Nakaya | 33/561 |
| 4,288,925 | 9/1981 | McMurtry | 33/561 |
| 4,447,958 | 5/1984 | Tanaka | 33/561 |
| 4,553,001 | 11/1985 | Kroetsch | 33/561 |

FOREIGN PATENT DOCUMENTS

| | | |
|---|---|---|
| 0 269 795 | 6/1988 | European Pat. Off. |
| 0 303 831 | 2/1989 | European Pat. Off. |
| 0 307 782 | 3/1989 | European Pat. Off. |
| 31 25 737 | 3/1982 | Germany |
| 37 13 415 | 11/1988 | Germany |
| 8-278107 | 10/1996 | Japan |

*Primary Examiner*—Thomas B. Will
*Attorney, Agent, or Firm*—Kanesaka & Takeuchi

[57] ABSTRACT

A touch sensor of the invention can output a directional information from which direction an object to be measured touches a contact, as well as a positional information. The touch sensor includes a movable plate; at least four movable support points provided on the movable plate in a rectangular shape; a measuring shaft attached to the movable plate to extend perpendicularly thereto; and a base plate situated at a side facing the movable support points and having at least four fixed support portions corresponding to the respective support points. When no force is applied to the measuring shaft, all the support points and support portions contact together. When the object to be measured touches a contact portion, two of the support points situated adjacent to each other become temporary rotational supporting points, and two support points provided at a side opposite to the temporary rotational supporting points are separated from the support members corresponding thereto. In the invention, less than four movable contact points and less than four fixed contact points corresponding thereto are selected. When one of the contact points actuates, a positional signal is outputted accurately.

9 Claims, 5 Drawing Sheets

|    | (1) | (2) | (3) |
|----|-----|-----|-----|
| X  | X   | X   | O   |
| X' | O   | O   | X   |
| Y  | X   | O   | O   |
| Y' | O   | X   | X   |

TOUCH SENSOR

CROSS-REFERENCE TO RELATED APPLICATION

The application is a continuation in part application of Ser. No. 08/542,301 filed on Oct. 12, 1995 now U.S. Pat. No. 5,594,995.

BACKGROUND OF THE INVENTION AND RELATED ART STATEMENT

The invention relates to a touch sensor to be used for controlling a dimension or a position of a workpiece.

Conventionally, as a touch probe in a three dimensional measuring system, a structure as disclosed in U.S. Pat. No. 4,339,714 has been well known.

More specifically, in U.S. Pat. No. 4,339,714, as shown in FIGS. 9–11, a probe 12' is provided with a contact 15' having a spherical end 16', which contacts an object 11' to be measured. The contact 15' has the other end provided with three arms 18' arranged radially and housed in a case 14' of the probe 12'. The three arms 18' arranged radially are provided with a pair of electrodes 17', respectively.

The electrodes 17' and a coil 20' are connected in series through a monitoring circuit 19', and a capacitor 22' is arranged parallel to the coil 20'. When a measuring is carried out, the probe 12' is moved so that the contact 15' touches the object 11' to be measured. When the contact 15' touches the object 11', the contact 15' in a rest state is moved to thereby separate from at least a pair of electrodes 17'. Thus, the circuit 19' is opened. By opening the circuit 19', it is realized that the probe 12' contacts the object to be measured.

In the above structure, in case a position of a tip of a cutting blade, such as a bit of a lathe, is regulated, it is required to measure a position of the tip of the cutting blade along a rotational center line, i.e. X–X' direction of the object to be cut, e.g. positioning a bit for cutting a right side and a bit for cutting a left side, and to measure a position of the tip of the cutting blade in a direction of Y–Y' perpendicular to the X–X' direction, e.g. positioning a flat bit and a drilling bit. In this case, it is impossible to output positional data relative to which direction the data are among the four X, X', Y, Y' directions, as well as a positional information.

As a conventional example wherein a directional information as well as a positional information can be outputted, a plan view of the example is shown in FIG. 7 and a front view thereof is shown in FIG. 8.

More specifically, individual touch sensors 21, 22, 23, 24 are provided on a main body 25 in the four directions of X, X', Y, Y', respectively. Reference numeral 26 represents a flange for fixing the main body 25 to, for example, an end of an arm fixed to a fixing portion on a main shaft side of a lathe.

In the above structure, surfaces to be touched are separated by several tens of millimeters, so that when the sensor is to be fixed to a lathe or the like, there is no space for fixing the sensor. Also, in case two bits are arranged parallel with a narrower space therebetween, which is less than a space between the surfaces to be attached, it is impossible to measure by the sensor. Further, since four touch sensors are provided in the respective four directions, a production cost thereof is increased.

In a parent application of U.S. pat. application Ser. No. 08/542,301, now U.S. Pat. No. 5,594,995 which corresponds to Japanese Pat. Application No. 7-117595, four movable contacts and four fixed contacts are arranged in a rectangular shape. When a measuring shaft is tilted, two out of the four movable contacts are separated from the corresponding fixed contacts to provide an OFF signal. When the two contact points provide the OFF signal, the OFF signal can not be accurately issued in actuating the measuring shaft repeatedly.

Therefore, an object of the present invention is to provide an accurate touch sensor capable of outputting positional data relative to which direction the data relate among the four directions of X, X', Y, Y', as well as a positional information.

Another object of the present invention is to provide an accurate touch sensor as stated above, wherein a distance between surfaces of the sensor to which a bit or the like touches is extremely shortened, so that the sensor is very compact and handy.

A further object of the present invention is to provide an accurate touch sensor as stated above, wherein the sensor can be easily manufactured at a low cost.

Further objects and advantages of the invention will be apparent from the following description of the invention.

SUMMARY OF THE INVENTION

A touch sensor of the invention can obtain directional and positional data. The touch sensor is basically formed of a movable plate; at least four movable support points provided on the movable plate and arranged in a rectangular shape; a measuring shaft attached to the movable plate to extend perpendicularly thereto; and a base plate situated at a side facing the movable support points and having at least four fixed support portions corresponding to the respective support points. The touch sensor further includes means for urging the movable plate to the base plate.

When no force is applied to the measuring shaft, all the support points and support portions contact together. When an object to be measured touches a contact portion of the measuring shaft, a first two of the support points which are adjacent to each other become temporary rotational support points, and a second of the two support points which are adjacent to each other and provided at a side opposite to the first two adjacent support points are separated from two of the support members corresponding thereto.

In the invention, less than four movable contact points are selected from the at least four movable support points, and less than four fixed contact points are selected from the at least four fixed support portions corresponding to the less than four movable contact points. Therefore, when one of the contact points actuates, a positional signal is outputted accurately.

In particular, two support points out of the at least four support points arranged in the rectangular shape are selected as two movable contact points, which are situated diagonally with respect to each other. Also, two fixed contact points corresponding to the two movable contact points are selected from the at least four support portions to thereby form two pairs of the movable and fixed contact points. The two movable contact points are connected together such that the two pairs of the movable and fixed contact points are connected in series. As a result, when the object touches the contact portion of the measuring shaft, the positional signal is outputted from one of the two pairs of the movable and fixed contact points by interruption of the series connection.

In the touch sensor of the invention, three support points out of the at least four support points arranged in the rectangular shape may be selected as three movable contact points. In this case, three fixed contact points corresponding to the three movable contact points are selected from the at least four support portions. Accordingly, three pairs of the movable and fixed contact points are formed, which are connected parallel to each other. Namely, the fixed contact points or the movable contact points are connected together. The other contact points, i.e. the fixed contact points or movable contact points, are individually attached to the lead lines, respectively. The lead lines located diagonally are used for obtaining the positional signal similar to the series connection explained above, and ON and OFF signals from the three lead lines are used as directional information.

In the invention, whenever the switch is used, one, not two, movable contact point is always used to output an OFF signal as a positional signal. Accordingly, the touch sensor can respond accurately and provide the OFF signal. In case two movable contact points output an OFF signal as in the parent application, repeating accuracy of the switch is about 2 $\mu$m. However, in case one movable contact point in the invention outputs an OFF signal, repeating accuracy of the switch is under 1 $\mu$m.

DETAILED DESCRIPTION OF PREFERRED EMBODIMENTS

Figure 1:
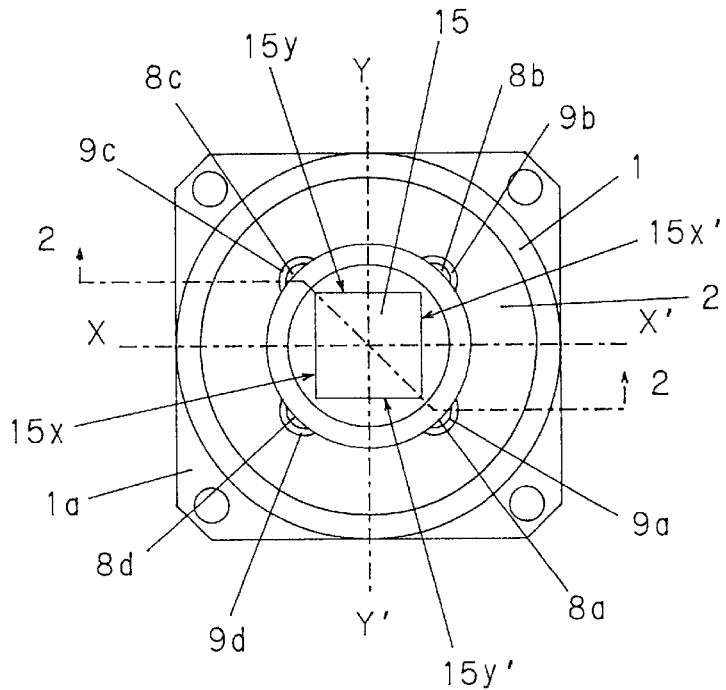
FIG. 1 is a plan view of a touch sensor of the invention.

Referring to the drawings, an embodiment of the invention is explained. FIG. 1 is a plan view of a touch sensor of the present invention, FIG. 2 is a sectional view taken along line 2—2 in FIGS. 1 and 3, and FIG. 3 is a section view taken along line 3—3 in FIG. 2.

Figure 2:
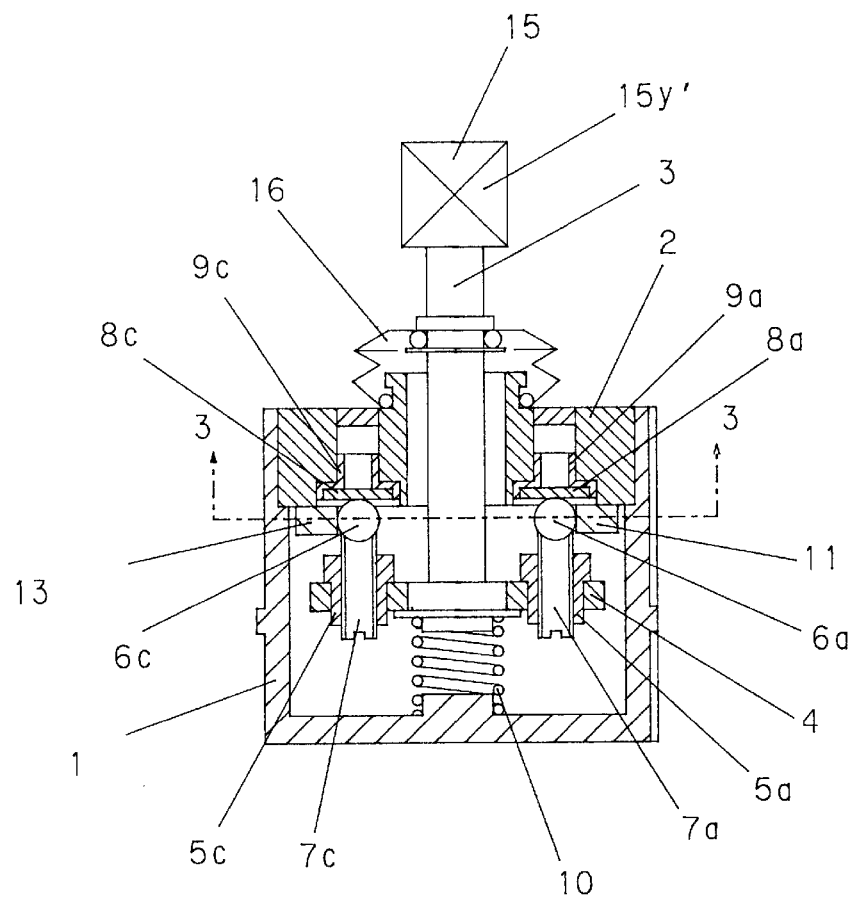
FIG. 2 is a sectional view taken along line 2—2 in FIGS. 1 and 3.
Figure 3:
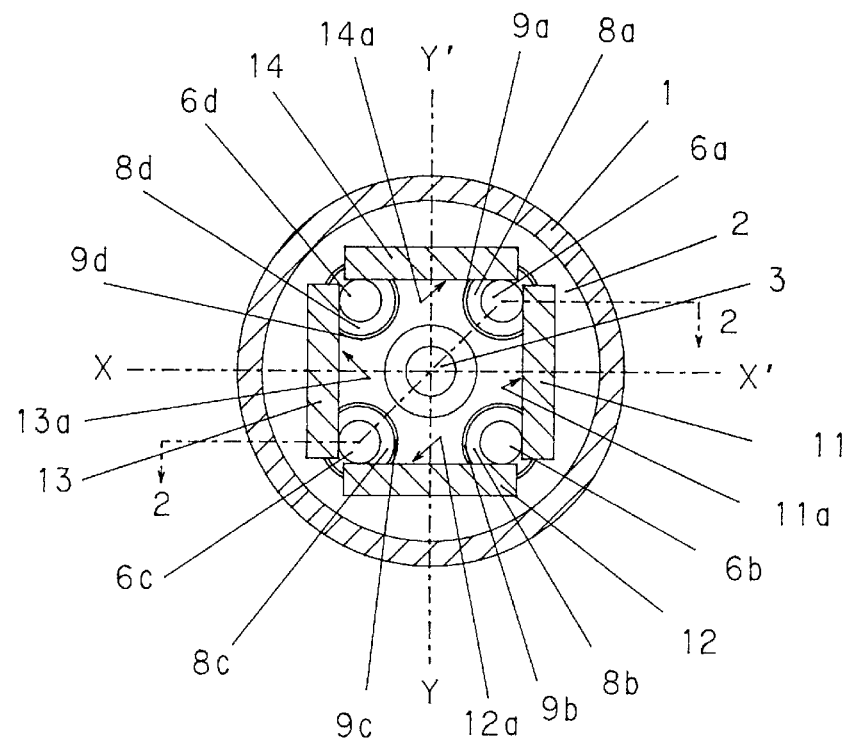
FIG. 3 is a sectional view taken along line 3—3 in FIG. 2.

In FIGS. 1, 2 and 3, reference numeral 1 represents a housing, and numeral 2 represents a base plate. A measuring shaft 3 passing through a central hole of the base plate 2 projects above the housing 1 at one end. A movable plate 4 located inside the housing 1 is connected to the other end of the shaft 3. Four sleeves 5a, 5b, 5c and 5d(5a and 5c are only shown in FIG. 2) made of an insulating material and having an internal thread are fixed to the movable plate 4 so that a central line of each internal thread is parallel to a central line of the measuring shaft 3. Screws 7a, 7b, 7c, 7d(7a and 7c are only shown in FIG. 2) have spherical movable support points 6a, 6b, 6c, 6d at the respective terminal ends and are screwed into the respective internal threads.

On the other hand, in an inner surface of the base plate 2, fixed contact plates 8a, 8b, 8c,8d made of an electroconductive hard material are held parallel to the inner surface of the base plate 2 at positions approximately opposite to the spherical movable support points 6a, 6b, 6c, 6d by holders 9a,9b, 9c, 9d made of an insulating material.

The movable plate 4 is urged by a compressing coil spring 10 provided between an inner surface of the housing 1 and one end of the measuring shaft 3 toward a direction such that the spherical movable support points 6a, 6b, 6c, 6d contact the respective fixed contact plates 8a, 8b, 8c,8d opposing thereto. In this respect, after the screws 7a, 7b, 7c, 7d are finely adjusted such that the respective spherical movable support points contact all the fixed contact plates, the screws 7a, 7b, 7c, 7d are permanently fixed to the sleeves 5a, 5b, 5c, 5d by an adhesive or the like.

Four imaginary lines connecting centers of the spherical movable support points 6a, 6b, 6c, 6d adjusted and fixed as described above form a rectangular shape or a square having four sides with equal lengths. For explanation, it is supposed that the present embodiment is made as the square shape having four sides with the equal lengths.

The square portion orients perpendicular to the central line of the measuring shaft 3, and a center of the square portion coincides with a center of the measuring shaft 3. Also, imaginary lines connecting centers of the respective sides of the square portion and the center of the measuring shaft 3 are expressed as X–X' and Y–Y', respectively, as shown in FIGS. 1 and 3.

Guides 11, 12, 13, 14 in a square-bar shape made of an insulating material are disposed in the inner surface of the base plate 2. The respective guides are arranged on the base plate 12 such that the spherical movable support points 6a, 6b lightly contact an inner side surface 11a of the guide 11; the spherical movable support points 6b, 6c lightly contact an inner side surface 12a of the guide 12; the spherical movable support points 6c, 6d lightly contact an inner side surface 13a of the guide 13; and the spherical movable support points 6d, 6a lightly contact an inner side surface 14a of the guide 14. The guides are tentatively fixed by screws or the like to the base plate 12, and then securely fixed thereto by an adhesive or the like. The respective square-bar shaped guides 11, 12, 13, 14 function such that the respective spherical movable support points 6a, 6b, 6c, 6d always contact the fixed contact plates 8a, 8b, 8c, 8d at constant positions, respectively.

A square-bar shaped contact portion 15 made of a very hard material and contacting a machining tool which is an object to be measured is integrally fixed to the projected end of the measuring shaft 3. The surfaces 15x, 15x' of the contact 15 orient perpendicular to the central line X–X', while the surfaces 15y, 15y' orient perpendicular to the central line Y–Y'.

Incidentally, reference numeral 1a is a flange integrally formed with the housing 1, and is used, for example, to fix the housing 1 to a terminal end of an arm fixed to a fixing position on a main shaft side of a cutting machine. Also, numeral 16 represents a rubber boot or cover to prevent dust from entering into an inner space formed by the housing 1 and the base plate 2.

Figure 4:
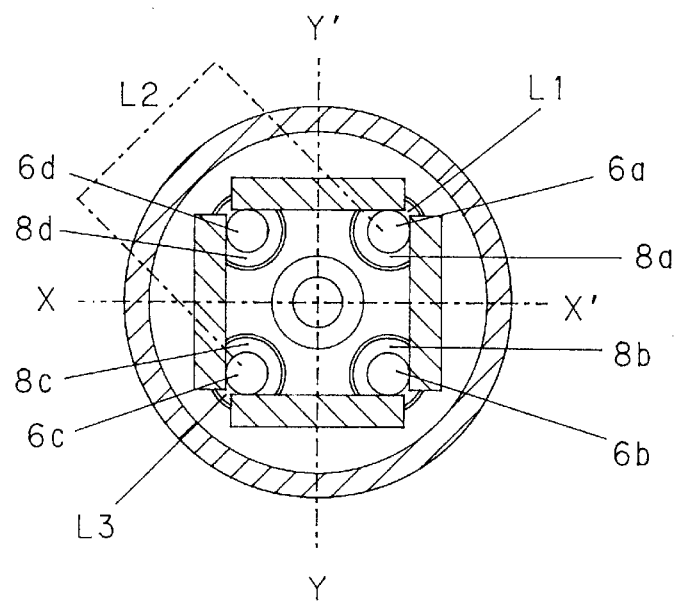
FIG. 4 is a wiring diagram.

FIG. 4 shows one example of a series connection of the wiring. Two spherical movable support points located diagonally, such as 6a, 6c, which are selected from the four support points, are used as spherical movable contacts, and two contact plates 8a, 8c corresponding to the movable contacts are used as fixed contacts. The fixed contact 8a is connected to a lead wire L1, and the fixed contact 8c is connected to a lead wire L3. The movable contacts 6a, 6c are connected to each other by a lead wire L2. The other ends of the respective lead wires L1, L3 are connected to a control device (not shown). The lead wire L1, the fixed contact 8a, the movable contact 6a, the lead wire L2, the movable contact 6c, the fixed contact 8c and the lead wire L3 are connected in series.

Next, an operation of the sensor of the invention is briefly described. When an object to be measured, such as a bit, contacts the surface 15x of the contact 15, the measuring shaft 3 inclines toward a right side in FIG. 2 relative to the spherical movable contact 6c and the support point 6d as a center, which are guided by the fixed contacts 8c,8d and the side surfaces 12a, 13a, 14a of the guides 12, 13, 14. Also, the spherical movable contact 6a is separated from the fixed contact 8a. As soon as the spherical movable contact 6a is separated from the fixed contact 8a, the connection between the lead wires L1, L3 is interrupted, and an OFF signal as a positional information, i.e. the bit contacts the measuring shaft, is outputted to the control device connected to the lead wires L1, L3.

Similarly, when the bit contacts the surfaces 15x' of the contact 15, the spherical movable contact 6c is separated from the fixed contact 8c. When the bit contacts the surface y, the movable contact 6a is separated from the fixed contact 8a, and when the bit contacts the surface y', the movable contacts 6c is separated from the fixed contact 8c. In all the situations, as soon as the movable contact is separated from the fixed contact, conduction between the lead wires L1 and L3 is interrupted, and an OFF signal as the positional information is outputted to the control device connected to the lead wires.

Figures 5, 6:
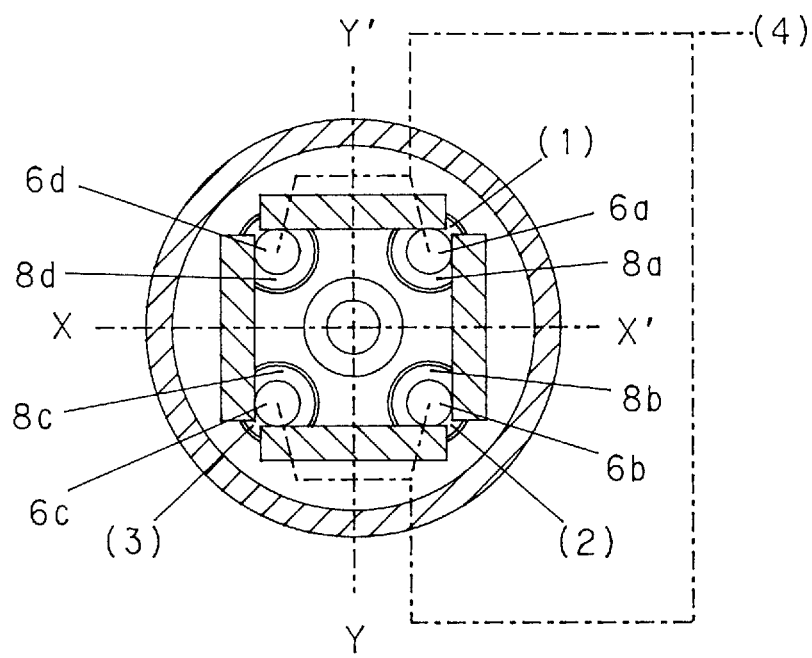
FIG. 5 is another wiring diagram.
FIG. 6 is a table showing a relationship between contact directions and outputs of lead wires.
Figure 7:
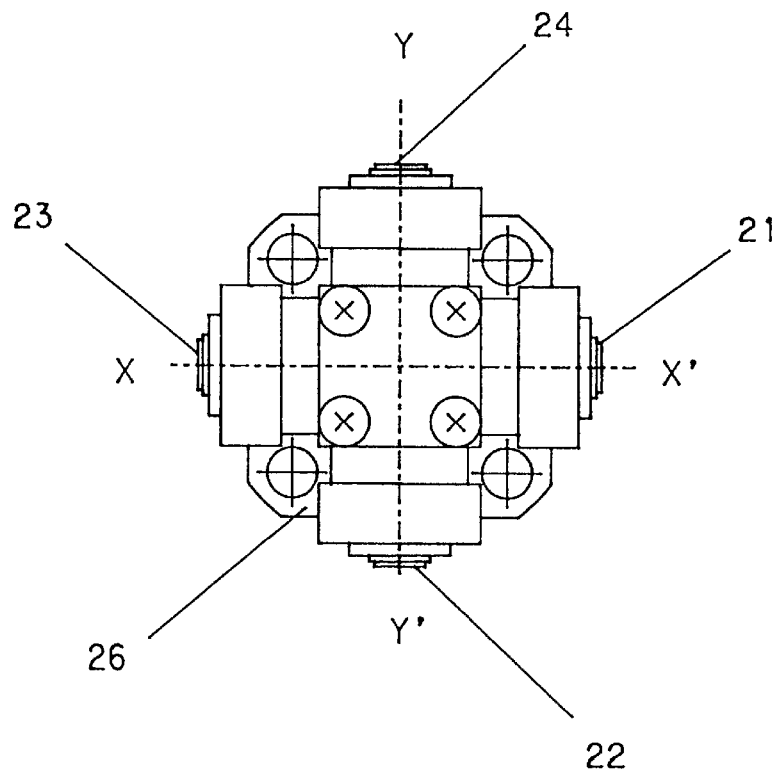
FIG. 7 is a plan view of a conventional touch sensor.
Figure 8:
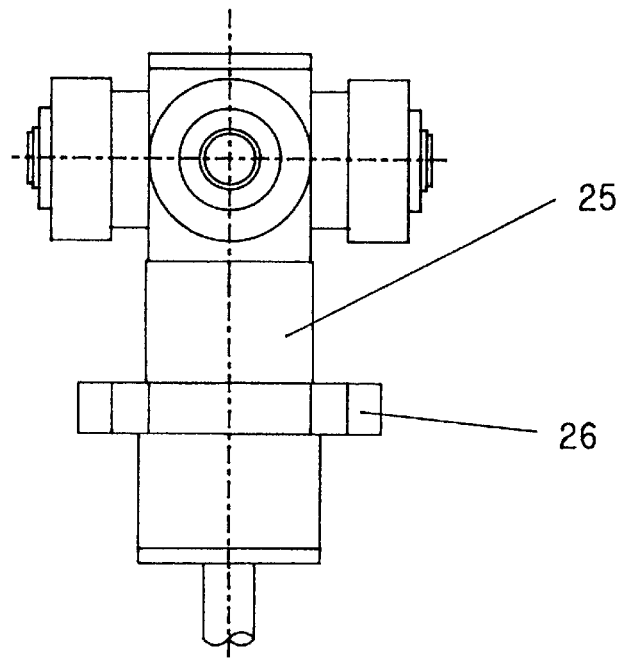
FIG. 8 is a front view of the conventional touch sensor of FIG. 7.
Figure 10:
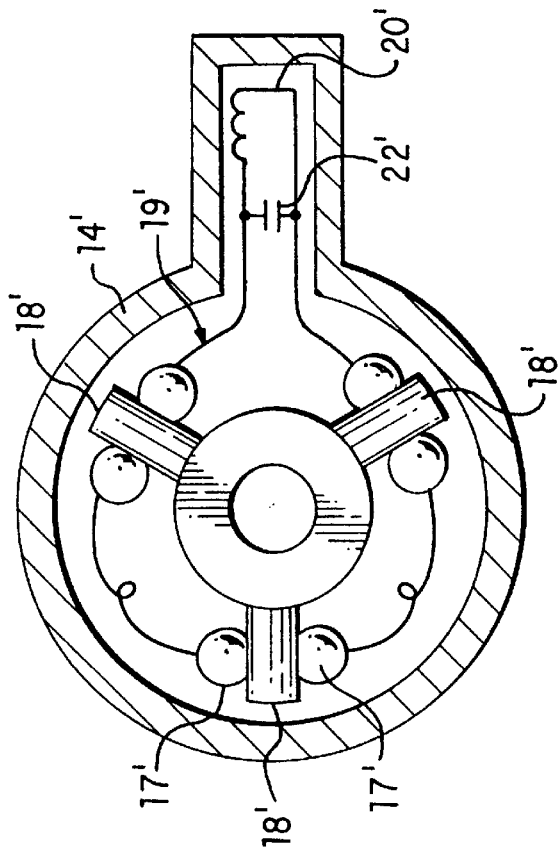
FIG. 10 is an explanatory plan view of a sensor in FIG. 9.
Figure 11:
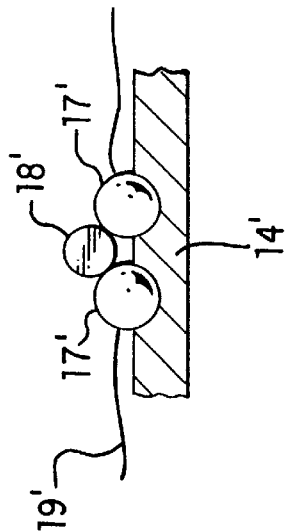
FIG. 11 is a side view of a part of an arm shown in FIG. 9.
Figure 9:
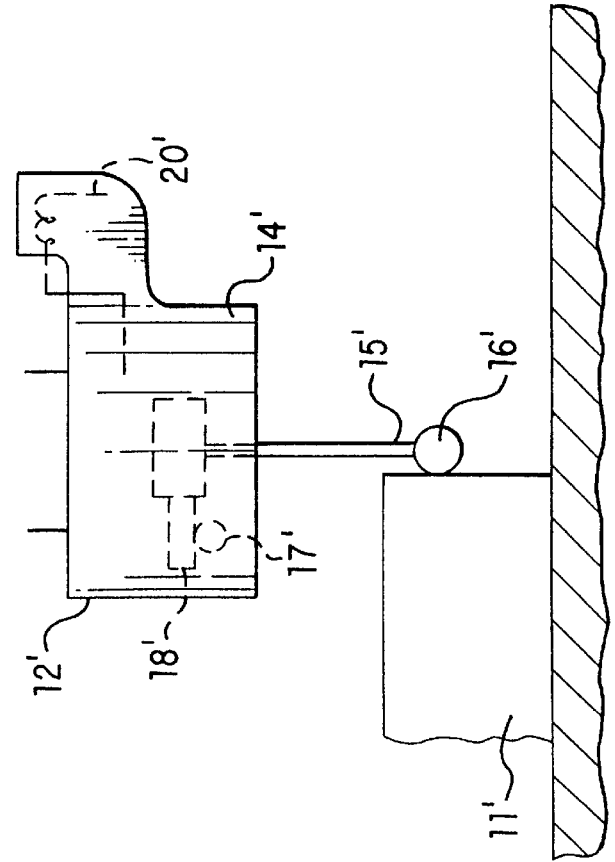
FIG. 9 is a side view of another conventional touch sensor.

FIG. 5 shows another wiring in a parallel connection. Desired three support points selected from the four movable support points 6a–6d are used as movable contacts. For example, 6a, 6b, 6c are selected as spherical movable contacts, and the support plates 8a, 8b, 8c corresponding to the movable contacts 6a, 6b, 6c are selected as fixed contacts. The contacts 6d, 8d are not used. The movable contacts 6a, 6b, 6c are connected to a common lead wire (4), while the respective fixed contacts 8a, 8b, 8c are connected to lead wires (1), (2), (3), respectively, and the other ends of the lead wires (1), (2), (3) are connected to a control device (not shown). Namely, the movable contact 6a, fixed contact 8a and lead wire (1); the movable contact 6b, fixed contact 8b and lead wire (2); and the movable contact 6c, fixed contact 8c and lead wire (3) are respectively connected to the common lead wire (4) in parallel.

FIG. 6 shows signals outputted by the respective lead wires (1), (2), (3) in the four directions of X, X', Y, Y' where an object to be measured contacts the contact 15 as shown in FIG. 5. O represents an ON signal, and X represents an OFF signal.

The operation is briefly explained. In case the bit contacts the surface 15x of the contact 15, the measuring shaft 3 inclines toward a right side in FIG. 2 relative to the spherical movable contact 6c and the support point 6d as a center, which are guided by the fixed contacts 8c,8d and the side surfaces 12a, 13a, 14a of the guides 12, 13, 14. Although conduction between the lead wires (3) and (4) is maintained, the movable contact 6a is separated from the fixed contact 8a. As soon as the movable contact 6a is separated from the fixed contact 8a, the connection between the lead wires (1) and (3) is interrupted, and as soon as the movable contact 6b is separated from the fixed contact 8b, the connection between the lead wires (2) and (4) is interrupted.

Similarly, FIG. 6 shows the situations when the bit contacts the surfaces 15x', 15y and 15y' of the contact 15 with an O mark in case of conduction between the lead wire (1), (2) or (3) and the lead wire (4), and with an X mark in case of interruption therebetween.

In FIG. 6, an OFF signal as to whether the bit touches the contact 15 of the measuring shaft 3 or not is determined by the control device with reference to the contact points located diagonally, i.e. lead wires (1) and (3). Namely, if the bit touches the contact 15, electricity passing through the lead wires (1), (4) and (3) is interrupted, so that the OFF signal is outputted to indicate a contact situation of the bit to the contact 15. On the other hand, the directional information of the contact 15 is judged by the combination of the O and X signals outputted to the control device as ON and OFF signals. Thus, a directional information from which direction the bit touches the contact 15 as well as the positional information can be obtained when the bit touches the contact 15.

Namely, since electric conductivity from the lead wire (1) to the lead wire (3) through the lead wire (4) is interrupted if the bit touches the contact 15 in any direction, the contact information of the bit to the contact 15 is obtained. Also, the directional information is obtained by the combination of the O and X signals since the same combination of the O and X signals does not exist in the four directions.

In the invention, since the contact information of the contact 15 is obtained by one of the movable contacts, not two as in the parent application, the accurate contact information is obtained. The repeating accuracy of the contact is extremely improved.

In the present embodiment, while the contact 15 has a square shape, the contact 15 may be of any shape, such as cylinder or sphere depending on an object to be measured.

According to the present invention, since a distance between a bit and a surface of a contact where the bit touches is extremely shortened, it is possible to obtain a compact and handy touch sensor capable of controlling positions in the four directions of X, X', Y and Y'.

Also, it is possible to obtain a touch sensor capable of outputting to a control device a directional information from which direction a bit touches a contact, when the bit touches the contact, among the positional control in the four directions of X, X', Y, Y', as well as a positional information.

Furthermore, it is possible to obtain a low-cost touch sensor capable of controlling positions including the positional information in the four directions of X, X', Y and Y' by one switch mechanism.

While the invention has been explained with reference to the specific embodiments of the invention, the explanation is illustrative and the invention is limited only by the appended claims.

What is claimed is:

1. A touch sensor for obtaining directional and positional data, comprising:

a movable plate;

at least four movable support points provided on said movable plate, said support points being arranged in a rectangular shape;

a measuring shaft attached to the movable plate to extend perpendicularly thereto, said measuring shaft having a contact portion at one end thereof;

a base plate situated at a side facing said movable support points and having at least four fixed support portions formed at positions corresponding to said respective support points;

means for urging the movable plate to the base plate so that when no force is applied to the measuring shaft, all the support points and support portions contact together and when an object to be measured touches said contact portion, a first two of said support points which are adjacent to each other become temporary rotational supporting points, and a second of said two support points which are adjacent to each other and provided at a side opposite to said first two adjacent support points are separated from two of said support members corresponding thereto; and less than four movable contact points selected from the at least four movable support points and less than four fixed contact points selected from the at least four fixed support portions corresponding to said less than four movable contact points so that when one of said less than four contact points actuates, a positional signal is outputted accurately.

2. A touch sensor according to claim 1, wherein two support points out of the at least four support points arranged in the rectangular shape, which are situated diagonally with respect to each other, are selected as two movable contact points, two fixed contact points corresponding to said two movable contact points being selected from the at least four support portions to thereby form two pairs of the movable and fixed contact points, said two pairs of the movable and fixed contact points being connected in series so that when the object touches the contact portion of the measuring shaft, the positional signal is outputted from one of the two pairs of the movable and fixed contact points by interruption of the series connection.

3. A touch sensor according to claim 1, wherein three support points out of the at least four support points arranged in the rectangular shape are selected as three movable contact points, three fixed contact points corresponding to said three movable contact points being selected from the at least four support portions to thereby form three pairs of the movable and fixed contact points, which are connected parallel to each other.

4. A touch sensor according to claim 3, wherein one part of the fixed contact points and the movable contact points is connected together and attached to a first lead line, and the other part of the fixed contact points and the movable contact points is individually attached to second to fourth lead lines, respectively.

5. A touch sensor according to claim 3, wherein said movable contact points are connected together by a first lead line, and the three fixed contact points are individually attached to the second to fourth lead lines, respectively, two of said three fixed contact points, which are located diagonally, being used for the positional signal, and ON and OFF signals from the second to fourth lead lines being used for directional information.

6. A touch sensor according to claim 1, further comprising insulating guides provided on one of said base plate and said movable plate to surround the movable support points and the fixed support portions, said guides contacting and guiding one of the support points and the support portions.

7. A touch sensor according to claim 6, wherein one of said movable support points and said fixed support portions projects toward the other of said movable support points and said fixed support portions, said insulating guides being provided at said other of the movable support points and fixed support portions and contacting said one of the movable support points and fixed support portions which projects.

8. A touch sensor according to claim 7, wherein each of said movable support points projects toward the base plate and has a spherical shape portion, said insulating guides surrounding and contacting at side portions thereof the spherical shape portions of the movable support points.

9. A touch sensor according to claim 8, further comprising a housing containing the movable plate therein, said urging means being disposed between the housing and the movable plate, and said base plate having a hole, through which said measuring shaft extends tiltably.

* * * * *